(12) United States Patent
Golda et al.

(10) Patent No.: US 12,119,027 B2
(45) Date of Patent: Oct. 15, 2024

(54) METHOD AND APPARATUS FOR SIMULTANEOUS VIDEO EDITING

(71) Applicant: Logitech Europe S.A., Lausanne (CH)

(72) Inventors: Gleb Golda, Burnaby (CA); Christopher Marinho Milbourne, West Vancouver (CA); Iryna Kunytska, Vancouver (CA); Ashray Urs, San Jose, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 17/897,144

(22) Filed: Aug. 27, 2022

(65) Prior Publication Data
US 2023/0062137 A1    Mar. 2, 2023

Related U.S. Application Data

(60) Provisional application No. 63/238,025, filed on Aug. 27, 2021.

(51) Int. Cl.
| | | |
|---|---|---|
| *G06F 3/0483* | (2013.01) | |
| *G06F 3/0484* | (2022.01) | |
| *G11B 27/031* | (2006.01) | |

(52) U.S. Cl.
CPC .......... *G11B 27/031* (2013.01); *G06F 3/0484* (2013.01); *G06F 3/0483* (2013.01)

(58) Field of Classification Search
CPC .... G06F 18/00; G06F 18/214; G06F 2111/04; G06F 2111/08; G06F 30/00; G06F 30/12; G06F 30/17; G06F 30/18; G06F 30/27; G06F 1/03; G06F 5/01; G06F 7/50; G06F 7/535; G06F 3/04855; G06F 40/103; G06F 40/106; G06F 9/451; G06F 15/16; G06F 15/76; G06F 16/41; G06F 16/43; G06F 16/953; G06F 16/954; G06F 16/957; G06F 3/048; G06F 3/04883
See application file for complete search history.

(56) References Cited

U.S. PATENT DOCUMENTS

| | | | | |
|---|---|---|---|---|
| 8,341,525 B1 * | 12/2012 | Achour | ................ | G06Q 10/101 |
| | | | | 715/201 |
| 2006/0259585 A1 * | 11/2006 | Keohane | ................ | G06F 16/957 |
| | | | | 709/219 |
| 2006/0259957 A1 * | 11/2006 | Tam | ........................ | G06Q 50/01 |
| | | | | 726/3 |

(Continued)

*Primary Examiner* — Rayeez R Chowdhury
(74) *Attorney, Agent, or Firm* — Patterson & Sheridan LLP

(57) ABSTRACT

The disclosure generally relates to a method for simultaneously editing a video by a plurality of users which includes receiving a media file at the application server, decoding the media file using the process server, wherein decoding the media file using the process server comprises uncompressing the video streams and audio streams in the media file to access a plurality of video frames of the video stream and a plurality of audio packets of the audio stream, altering a plurality of video frames of a video stream and audio packets of an audio stream using a web application hosted on an application server, previewing the altered video stream and altered audio steam using the application server, and encoding the video stream and audio stream and the associated metadata using the process server.

11 Claims, 9 Drawing Sheets

(56) References Cited

U.S. PATENT DOCUMENTS

| | | | | |
|---|---|---|---|---|
| 2012/0042251 A1* | 2/2012 | Rodriguez | ............ | G11B 27/034 |
| | | | | 715/723 |
| 2012/0278731 A1* | 11/2012 | Marinkovich | ....... | G11B 27/034 |
| | | | | 715/751 |
| 2014/0040737 A1* | 2/2014 | Guerrera | .............. | G11B 27/031 |
| | | | | 715/716 |
| 2015/0149906 A1* | 5/2015 | Toff | ..................... | G11B 27/031 |
| | | | | 715/723 |
| 2016/0007085 A1* | 1/2016 | Dandachli | .......... | H04N 21/4542 |
| | | | | 725/28 |
| 2017/0017987 A1* | 1/2017 | Thomas | ................. | H04N 5/783 |
| 2019/0261041 A1* | 8/2019 | Swenson | .............. | G11B 27/031 |

* cited by examiner

METHOD AND APPARATUS FOR SIMULTANEOUS VIDEO EDITING

CROSS-REFERENCE TO RELATED APPLICATIONS

This application claims the benefit of U.S. provisional patent application Ser. No. 63/238,025, filed Aug. 27, 2021, which is herein incorporated by reference.

BACKGROUND

Field

Embodiments of the present disclosure generally relate to a system and methods of generating and revising media content. More particularly, the application relates to collaborative video editing methods between a plurality of users for simultaneous video stream editing and a system configured to enable these methods.

Description of the Related Art

In the course of creating a media production, multiple members of a production team may need to work together to create a media product. Media products will typically include one or more electronic files that include video and/or audio data. One task in the creation of a media production is the synchronization of recorded audio with recorded video. One member of the production team may specify the scenes that need music, another member of the production team may be in charge of finding music for those scenes, another member may align the start and end of a particular music track with particular frames of a video scene, and yet another member of the production team may be in charge of reviewing the mix to decide if the result makes the final cut.

One conventional technique used to edit a video is to create a fixed movie file with the embedded audio and then either email the file to other intended recipients or post the fixed movie file to a file server for retrieval so that various people can then separately edit a desired file. Other more manual processes, such as manually burning and delivering compact disks and DVDs may also be done. However, current techniques suffer from numerous deficiencies. Thus, additional time is required to compile and send each updated version as they are generated during the editing process. In addition, if multiple alternative tracks need to be reviewed, a fixed movie file for each alternative track would need to be generated and sent, resulting in inefficient network and storage utilization, and lead to complicated integration of each of the edited tracks. In some cases where a single file is edited by more than one person, conventional methods require a serial editing process that prevents multiple users performing related editing activities, which is time inefficient due to limitations on who and when each person can access and edit the file(s). Furthermore, traditional media players have not been designed for editing synchronization of video and audio in a collaborative environment, and thus cannot allow for efficient editing and commenting during the generation of media presentations.

Accordingly there is a need in the art for a system and methods that solve the problems described above.

SUMMARY

The present disclosure generally provides for a method and system for one or more users to simultaneously alter a media file in a collaborative environment. In one embodiment, a method for simultaneously editing a video by a plurality of users that includes receiving, by an application server, a media file that comprises video data and audio data, decoding the media file, wherein decoding the media file comprises accessing the video data and the audio data of the media file, altering the video data or the audio data using a web application hosted on an application server, wherein altering the video data or the audio data comprises generating a first alteration parameter that includes information relating to the alterations made to the video data or the audio data, and the alteration parameter is stored within an alteration parameter database, previewing the video data and audio data after altering the video data or the audio data, wherein previewing the video data or the audio data comprises generating altered video data based on the video data or altered audio data based on the audio data, and the altered video data or altered audio data is altered based on information contained within the generated first alteration parameter, and generating an altered media file, which is based off of the received media file, by processing the first alteration parameter.

In another embodiment, a system for simultaneously editing a video by a plurality of users, the system comprising a web application hosted on an application server comprising a collaboration region, a preview screen and a chat box. The system further having a process server for encoding and decoding a video stream and an audio stream, where the collaboration region comprises a video stream region and an audio stream region, and where the preview screen that is configured to allow a user to view the alterations made to the video data or the audio data in real time.

In yet another embodiment, a method for simultaneously editing a video by a plurality of users comprising, receiving a media file at an application server, uncompressing the media file at a process server to form an uncompressed media file that comprises video data and audio data derived from the media file, receiving one or more user generated alteration parameter to alter the video data of the video stream or audio data of the audio stream at the application server, where the user alteration parameters are generated on a web application hosted on an application server, applying the one or more user generated alteration parameters to the video data or the audio data to form an altered uncompressed media file, previewing the altered uncompressed media file on a user interface of web application, and executing the alteration parameters to create a new media file at the process server.

In another embodiment, a method for simultaneously editing a video by a plurality of users comprising, receiving a media file at the application server, uncompressing the media file at the process server to access video frames of video streams and audio packets of audio streams in the media file, receiving a first alteration parameter generated by a first user to alter the video data of the video stream and audio data of the audio stream at the application server, where the first alteration parameter is generated on a web application hosted on an application server, receiving a second alteration parameter generated by a second user to alter the video data of the video stream and audio data of the audio stream at the application server, where both the first alteration parameter and second alteration parameter are generated at the same time, and where both the first alteration parameter and second alteration parameter are received by the application server at about the same time, previewing the alteration parameters on a user interface of web application, and executing the alteration parameters to create a new media file at the process server.

Embodiments of the disclosure may further provide a method for simultaneously editing a video by a plurality of users comprising receiving, by an application server, a media file that comprises video data and audio data, decoding the media file, wherein decoding the media file comprises accessing the video data and the audio data of the media file, altering the video data or the audio data using a web application hosted on an application server, previewing the video data and audio data after altering the video data or the audio data, and generating an altered media file, which is based off of the received media file. The process of altering the video data or the audio data using a web application hosted on an application server includes generating a first alteration parameter that includes information relating to the alterations made to the video data or the audio data, and storing the first alteration parameter within an alteration parameter database. The process of previewing the video data and audio data after altering the video data or the audio data includes generating altered video data based on the video data or altered audio data based on the audio data, and the altered video data or altered audio data is altered based on information contained within the generated first alteration parameter. The process of generating the altered media file includes processing and/or applying the first alteration parameter.

Embodiments of the disclosure may further provide a method for simultaneously editing a video by a plurality of users comprising receiving a media file at an application server; uncompressing the media file at a process server to form an uncompressed media file that comprises video data and audio data derived from the media file; receiving one or more user generated alteration parameters to alter the video data of the video stream or audio data of the audio stream at the application server, wherein the user alteration parameters are generated on a web application hosted on an application server; applying the one or more user generated alteration parameters to the video data or the audio data to form an altered uncompressed media file; previewing the altered uncompressed media file on a user interface of web application; and executing the alteration parameters to create a new media file at the process server.

Embodiments of the disclosure may further provide a system for simultaneously editing a video by a plurality of users comprising a web application hosted on an application server comprising a collaboration region and a preview screen. The web application is configured to allow a user to alter the video data or the audio data within a media file, wherein altering the video data or the audio data comprises generating a first alteration parameter that includes information relating to the alterations made to the video data or the audio data, and storing the first alteration parameter within an alteration parameter database within memory, and preview the video data or audio data after altering the video data or the audio data. Previewing the video data or the audio data comprises generating altered video data based on the video data or altered audio data based on the audio data, wherein the altered video data or altered audio data is altered based on information contained within the generated first alteration parameter, and displaying the altered video data on the preview screen or playing the altered audio data.

Embodiments of the disclosure may further provide a method for simultaneously editing a video by a plurality of users comprising receiving, by an application server, a media file that comprises video data and audio data; altering the video data or the audio data using a web application hosted on an application server, wherein altering the video data or the audio data comprises: generating, by a first user, a first alteration parameter that includes information relating to a first alteration made to the video data or the audio data during a first time period; storing the first alteration parameter within an alteration parameter database; generating, by a second user, a second alteration parameter that includes information relating to a second alteration made to the video data or the audio data during a second time period, wherein the first time period and second time period overlap in time; and storing the second alteration parameter within an alteration parameter database; previewing the video data and audio data after performing the first alteration or the second alteration, wherein previewing the video data or the audio data comprises generating altered video data based on the video data or altered audio data based on the audio data, and the altered video data or altered audio data is altered based on information contained within the generated first alteration parameter and the second alteration parameter; and generating an altered media file, which is based off of the received media file, by applying the first alteration parameter and the second alteration parameter.

Embodiments of the disclosure may further provide a method for simultaneously editing a video by a plurality of users comprising: receiving, by an application server, a media file that comprises video data and audio data, and altering the video data or the audio data in response to instructions provided by one or more users to a web application hosted on an application serve. The method of altering the video data or the audio data includes: generating, by a first user of the one or more users, a first alteration parameter that includes information relating to a first alteration to be made to the video data or the audio data during a first time period; storing the first alteration parameter within an alteration parameter database; preventing a second user of the one or more users from generating a second alteration parameter that includes information relating to a second alteration to be made to the video data or the audio data during a second time period, wherein the first alteration parameter and the second alteration parameter relate to a common portion of the video data or the audio data, and wherein the first time period and second time period overlap in time; presenting, via a user interface to the second user, during the first time period an indication that the common portion of the video data or the audio data is being altered; and terminating the prevention of the second user from generating a second alteration parameter after the end of the first time period.

Embodiments of the disclosure may further provide a method for simultaneously editing a video by a plurality of users comprising: receiving a video stream and/or audio stream at an application server, wherein the video stream comprises video data and the audio stream comprises audio data; receiving, from a first user, one or more first user generated alteration parameters to alter the video data of the video stream or audio data of the audio stream at the application server, wherein the user alteration parameters are generated on a web application hosted on an application server; receiving, from a second user, one or more second user generated alteration parameters to alter the video data of the video stream or audio data of the audio stream at the application server, wherein the user alteration parameters are generated on a web application hosted on an application server; applying the one or more first user generated alteration parameters and the one or more second user generated alteration parameters to the video data or the audio data to form an altered uncompressed media file; previewing the altered media file on a user interface of web application; and executing the one or more first user generated alteration parameters and the one or more second user generated alteration parameters to create a new media file at a process server.

Embodiments of the disclosure may further provide a method for simultaneously editing a video by a plurality of users comprising receiving, by an application server, a media file that comprises video data and audio data, and altering the video data or the audio data in response to instructions provided by one or more users to a web application hosted on the application server. The method of altering the video data or the audio data comprises receiving, by a first user of the one or more users at a first time, an indication that a portion of the video data or the audio data is being analyzed by a second user of the one or more users, generating, by the first user, a first alteration parameter that includes information relating to a first alteration made to the video data or the audio data at a second time, and storing the first alteration parameter within an alteration parameter database, wherein the second time is after the first time due to a portion of the video data or the audio data being locked for a first period of time during which the first user is prevented from altering the portion of video data or audio data being analyzed by the second user, the first period of time includes the first time, and the second time occurs after the first period of time has ended.

Embodiments of the disclosure may further provide a system or a method for simultaneously editing a video by a plurality of users comprising: receiving, by an application server, a media file that comprises video data and audio data; analyzing, on a first instance of a web application hosted on the application server, a portion of the video data or the audio data, wherein analyzing the portion of the video data or the audio data is performed by a first user of the plurality of users for a first period of time; preventing a second user of the plurality of users from altering the portion of the video data or the audio data during the first period of time; and generating an indication that the portion of the video data or the audio data is being analyzed by the first user, wherein the generated indication is received on a second instance of the web application by a second user. The generated indication may be received on the second instance of the web application by the second user after the second user has attempted to at least analyze the portion of the video data or the audio data during the first period of time. In some cases, the system may further comprise a web application hosted on the application server that comprises a collaboration region and a preview screen.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure include a system and methods that are configured to enable simultaneous collaborative video editing by multiple users. The collaborative video editing process disclosed herein can include simultaneous editing in real time, by two or more users, one or more portions of a media file that can contain audio elements, video elements, text and/or images.

Figure 1:
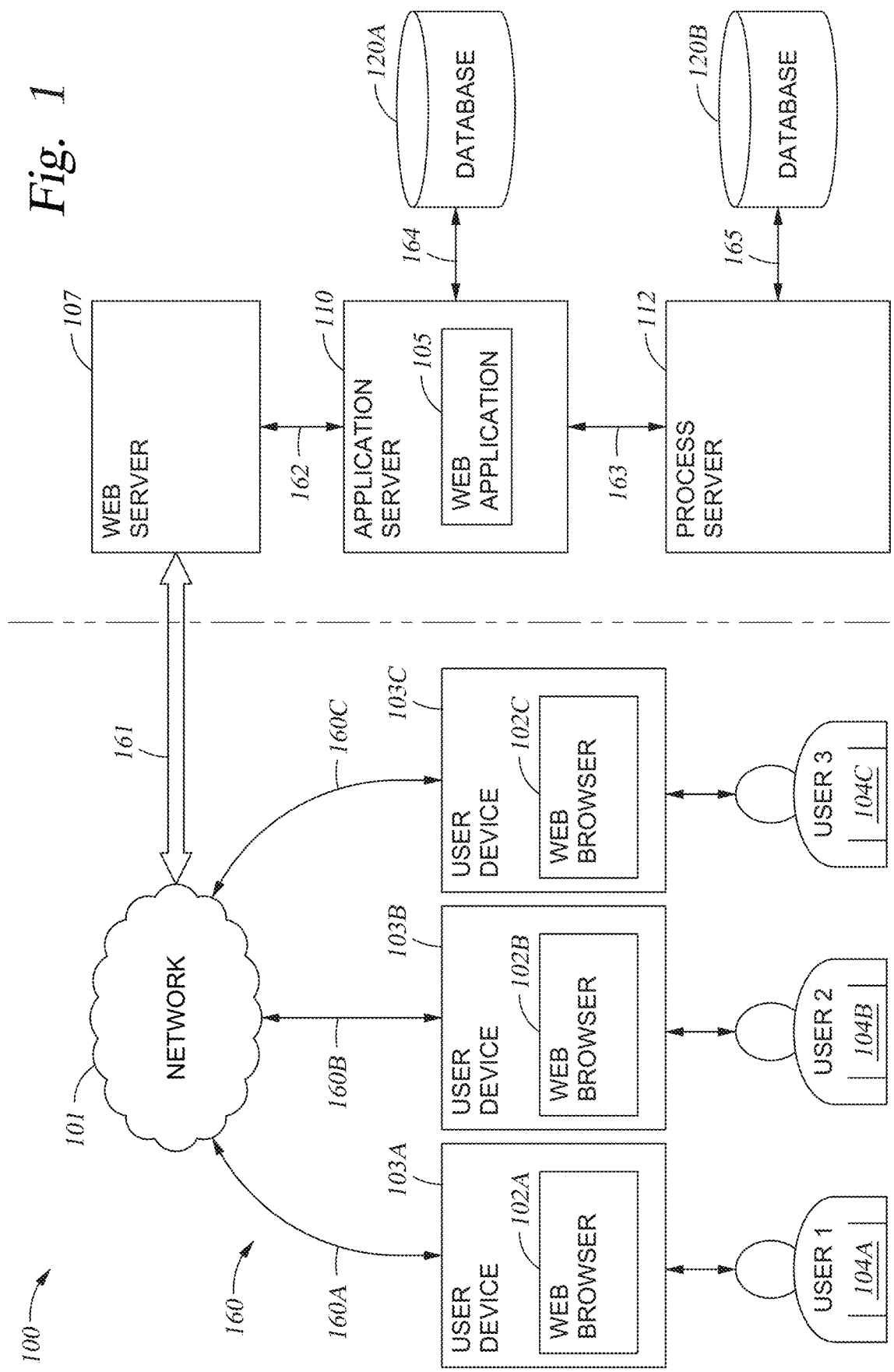
FIG. 1 is a high-level block diagram of the client server environment according to one embodiment of the multi-user collaborative video editing system.

FIG. 1 is a high-level block diagram of the client-server environment of the multiuser collaborative video editing system 100. The multi-user collaborative video editing system includes a network 101, a plurality of web browsers 102A-102C, a web server 107, an application server 110 and a process server 112. While not intended to be limiting as to the scope of the disclosure provided here, in some embodiments, the process server 112 is a "headless server" that generally does not include a keyboard, mouse, touchscreen, or other local interface. The network 101 represents any combination of one or more local access networks (LAN), wide area networks (WAN), WiFi networks, or service provider networks. Data exchanged over network 101, may be transferred over one or more communication links 160-161 using any number of network layer protocols, transportation layer protocols, and/or application layer protocols.

The application server 110 hosts the web application 105, and is in digital communication with both the web server 107 and the process server 112. The web application 105 includes application software that runs on the application server 110. Unlike computer-based software programs that run locally on the operating system of a device (e.g., user device 103), the web application 105 is accessed by the user through a web browser through an active network connection. The web application 105 includes a user interface 300 (FIG. 3A) that is displayed on the various user devices 103, and through which the users 104 can communicate with the application server 110. The process server 112 sends and receives data to and from the application server 110 via a communication link 163. Both the application server 110 and the process server 112 send and receive stored files from databases 120A and 120B can be provided by a secured cloud storage provider, such as a binary large object (BLOB) storage provider or other secure cloud storage facility via communication links 164 and 165.

The web server 107 facilitates digital communication between the application server 110 and the plurality of web browsers 102A-102C through communication link 162. Each web browser 102, such as web browser 102A, 102B, or 102C, is associated with a respective user 104 and user device 103. Unlike a client server application, which is installed on the client's computer (e.g., user device 103A-

C), a web application 105 runs on the application server 110. While not intending to be limiting as to the scope of the disclosure provided herein, in one example, a client server application that can be used with one or more of the embodiments disclosed herein includes software programs such as Chrome, Firefox, Microsoft Edge, Safari, Opera, Internet Explorer or other similar browsers or mobile apps that are configured to be used in conjunction with the web application 105 running on the application server 110. By running on the application server 110, the web application 105 is able to readily scale to accommodate any number of desired users 104. In this configuration, computational intensive tasks are performed by the application server 110 and/or process server 112, as is discussed further below, which removes the need for the user devices 103 to perform computational intensive tasks and lowers the computational requirements of the user devices 103. Although three users 104A-104C are shown in FIG. 1, any number of users 104 can communicate with the web application 105, using a URL in their respective web browsers, or mobile apps.

Figure 2:
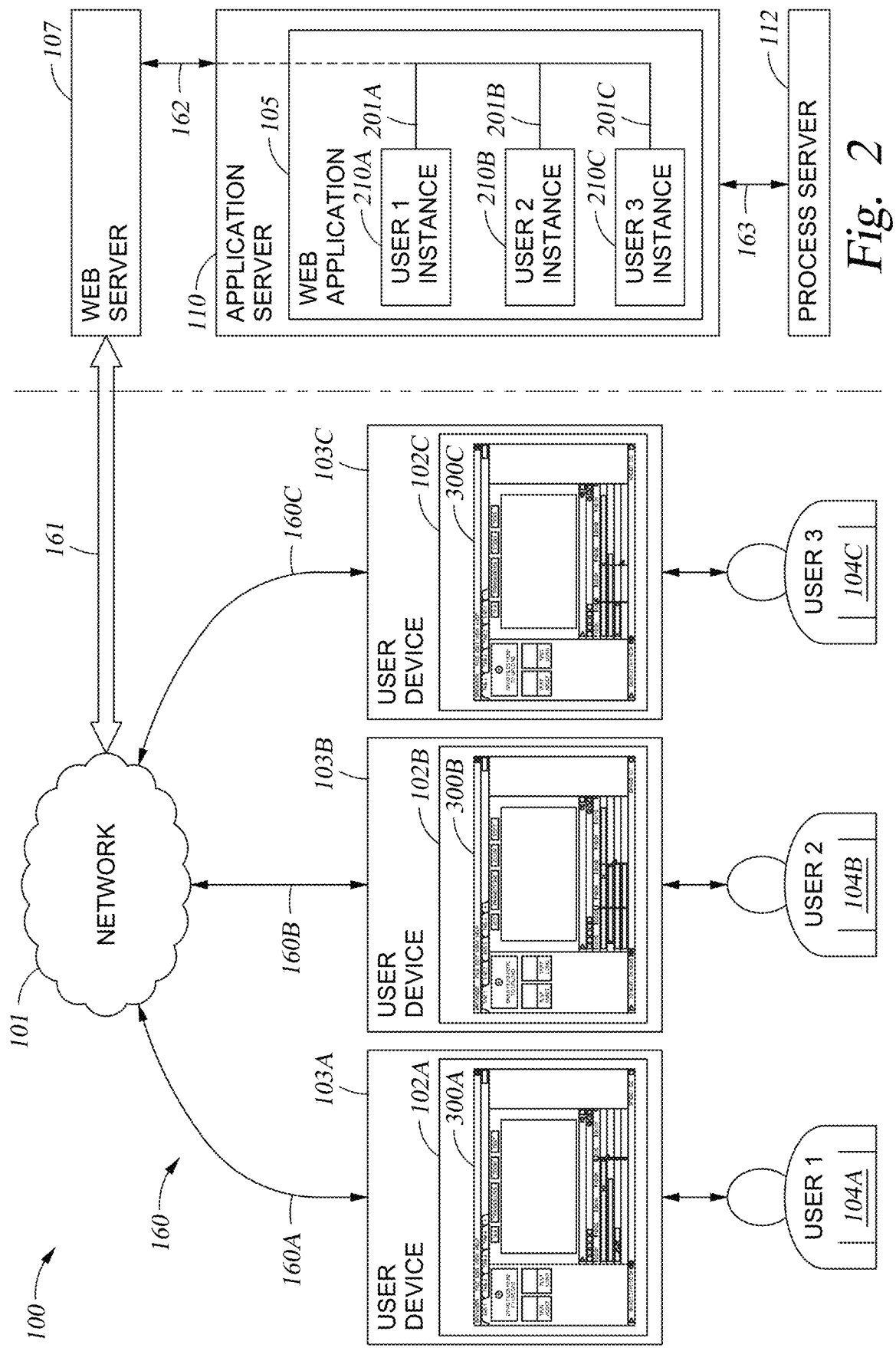
FIG. 2 is a block diagram of a collaborative editing environment according to one embodiment.

FIG. 2 is a block diagram of a collaborative editing environment according to one embodiment. Here, the collaborative editing environment includes a plurality of users 104, the web server 107, the application server 110 having a web server application 105, the process server 112, and a plurality of instances 210, such as instances 210A, 210B, 210C that are respectively associated with a correlating plurality of threads 201A, 201B, 201C.

As illustrated in FIG. 2, each user 104A, 104B or 104C communicates with the application server 110 through a thread 201A, 201B, 201C, respectively, and creates an instance 210A, 210B, 210C within the web application 105 that is viewable and able to be interacted with on their local computer (i.e., client computer) by use of a user interface 300 created by their respective client server application. On the front-end, a user will see an instance as a typical web-page. FIGS. 3A-3D are schematic views of a user interface according to one embodiment. Each user 104 communicates with an instance 210A, 210B and/or 210C on the application server 110 through a respective thread 201A, 201B, 201C on the application server 110. In general, a thread is an individual process request on a server. A server can have multiple threads (i.e., processes) running at the same time. Each instance 210 and thread 201 is individually associated with each user 104. For example, the first user 104A is associated with a first instance 210A through a first thread 201A that is formed between the user device 103A and application server 110 by use of the network 101, web server 107 and communication links 160A, 161 and 162. Because the web server 107 is scalable to any number of users, any number of instances can be instantiated, though each instance may be limited in the number of concurrent users. Accordingly in a three user example, a first user 104A, a second user 104B and a third user 104C, would each communicate with the application server 110 through a respective thread associated with each instance 210A, 210B, 210C of the web application 105.

Furthermore, instances of the web application can be shared between users. In this way, users are able to simultaneously collaborate together on the same web application 105 (i.e., web-page). By sharing instances within the web application 105 between users, multiple users 104 can collaborate on a video/audio project on the same shared instance 210 within the web application 105. Moreover, the collaboration can be concurrent. Without sharing instances, users would not be able to collaborate on a shared web application 105 in real time. Collaboration can include shared viewing, or altering audio/video/text/image content by editing audio/video data within one or more audio/video streams, and even adding or removing one or more of the audio/video streams. While the disclosure below primarily discusses the editing of audio data and/or video data, this discussion is not intended to be limiting as to the scope of the disclosure provided herein since text, images, or other kinds of data that could displayed and edited by use of computer, could also be collaboratively edited using one or more the techniques disclosed herein. During an editing process performed by each user 104A-104C, a user 104A, 104B or 104C will provide user input that is seen by the web application 105 as a series of alteration parameters to alter video data and audio data. Each user 104A-104C can also observe/track the activity of each user 104A-104C in the action bar 310 (of FIG. 3) in real time. This is further explained in FIG. 3A below.

Figure 5:
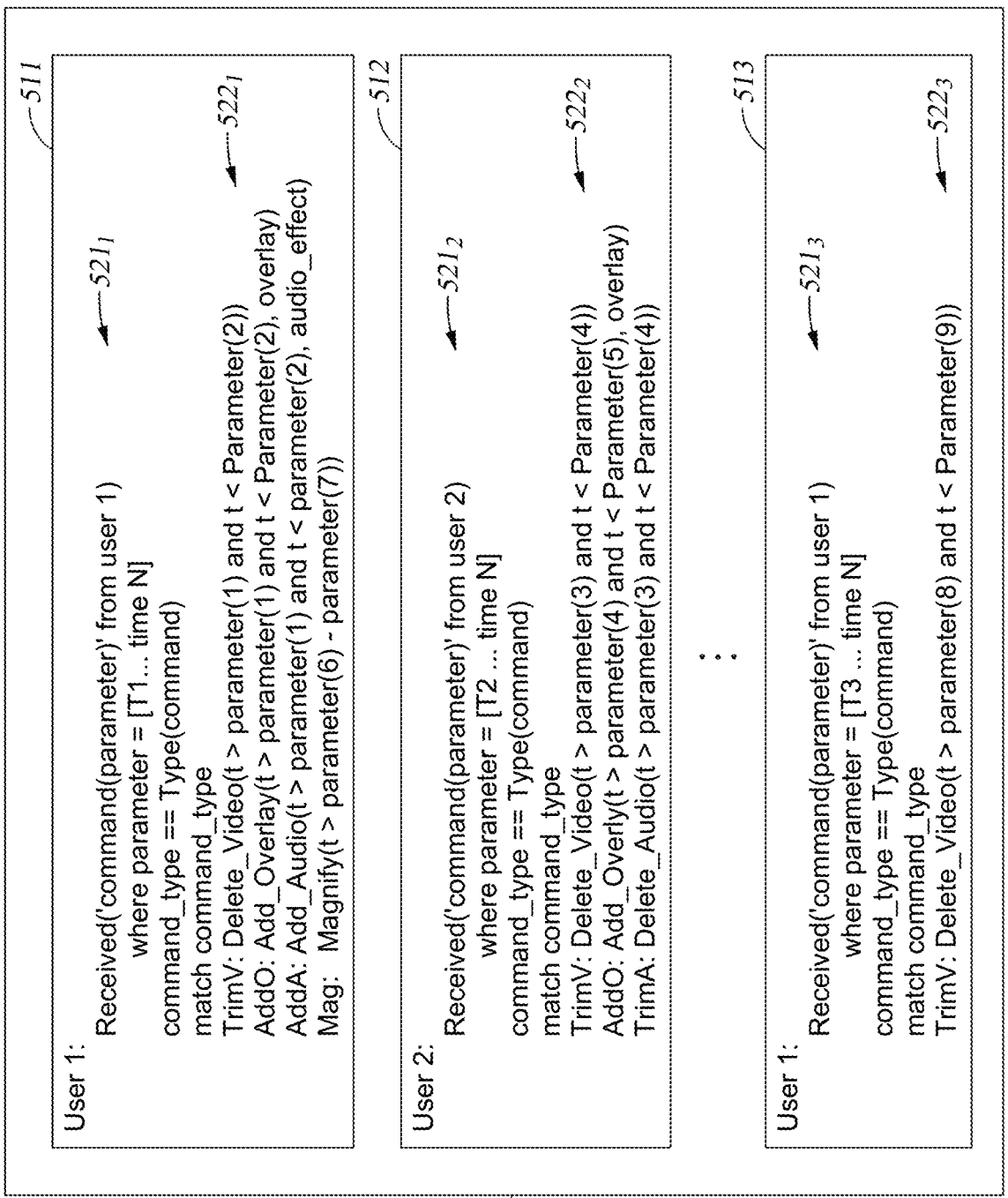
FIG. 5 is an example of an alteration parameter database that contains a plurality of alteration parameters according to one embodiment.

During an editing process performed by each user 104A-104C, a user 104A, 104B, 104C will provide user input that is logged by the web application 105 as an alteration parameter that is used to describe the alteration of video data and/or audio data created by the user input. The user input, such as keystrokes or mouse clicks applied to an audio or a video stream shown in an action bar 310 of a user interface 300 (FIG. 3A) for example, are used to generate alteration parameters that are stored in an alteration parameter database 501 by the web application 105 on the application server 110. The alteration parameter database 501 can be stored in a memory location of memory (e.g., non-volatile memory, non-transitory memory, etc.) associate with the application server 110. FIG. 5 schematically illustrates an alteration parameter database 510 that can include a plurality of alteration parameters, such as parameters 511, 512 and 513, which when executed by the software running on the web application 105 and/or process server 112 are used to either illustrate and represent that initial un-finalized edits to the video data and/or audio data of the media file, or used as a script to perform the finalized edits to the video data and/or audio data on the original media data, which in some embodiments, is stored as a binary large object (BLOB). These alteration parameters 511, 512 and 513 include commands that are executed at the process server 112 to create a new altered media file, which is formed using a finalized version of the alteration parameter database 501, by the process server 112. Thus, as the user alters video data within a video stream or audio data within an audio stream, the user generates alteration parameters that are received at, and stored within, the alteration parameter database 501 in an application server database within the application server 110. In some embodiments, the alteration parameter database, video data and audio data reside at a cloud storage location, and the users are remotely located from the cloud storage location. During the process of reviewing or editing, instances synchronize communications between users and provide an API to store and retrieve alteration parameters, as well as configuration parameters and file locations. The parameters are applied to the application accessed by the user's web browser when files are being replayed for review. Once a user is satisfied with their alterations, the alteration parameters 511, 512, and/or 513 found in the finalized alteration parameter database 501 are executed at the process server 112 to create a new media file. To create a new edited media file, the revised audio stream and video stream must be compressed, and stored in a container along with metadata associated with each stream. Thus, running the user generated alteration parameters at the application server 110, allows the user to view the effect of the alteration parameters generated during the editing process without altering the original media file. This process allows the plurality of users to quickly view their alterations in real time, rather than having to wait for a server or client computer to generate a new media file each time an alteration is made to a media file by executing the user generated alteration parameters.

Storing user generated alteration parameters 511, 512, 513 in an alteration parameter database 501 is especially useful for times when a user wants to review and/or undo edits made by any of the users that are editing portions of the received media file. The software running on the user device will generally include the ability to review and undo edits by use of an undo function provided on the user interface that is configured to alter one or more of the alteration parameters 511, 512, 513 in the alteration parameter database 501. The undo function allows a user to revert the video data or audio data to a previous state by altering or removing the alteration parameters. By removing (e.g., overwriting, or deleting) previously generated alteration parameters for the uncompressed video streams (video frames) and uncompressed audio streams (audio packets) provided at the application server 110, a user is able to revert the video or audio data of the video or audio stream to a previous state without the need to generate a new media file that matches the previous state. Thus, in one example, in cases where video data was accidently deleted during an editing process the software would not need to add back the frames deleted from the uncompressed video stream when the alteration parameter is deleted, since the deleted frames were not actually deleted from the uncompressed video streams during the editing process.

As users 104A-104C are simultaneously analyzing and/or editing video and audio streams (on an individual instance 210A-210C of the web application 105), the users 104A-104C are sharing against multiple threads 201A-201C (i.e., sharing across multiple processes on the server). To prevent a "tug-of-war" between the plurality of users 104A-104C attempting to simultaneously analyze and then based on the analysis alter the same video frames of a video stream or the same audio packets of an audio stream, the application server 110 further includes a locking feature. The process of analyzing the video or audio streams can include viewing and making adjustments to the video or audio streams before an edit is actually made to the video and audio streams, while the process of editing the video and audio streams will generally include the process of analyzing the video and audio streams along with the actual implementation of the adjustments, which were determined during the analyzing process, to the video and audio streams. The actual implementation of the adjustments is often referred to herein as altering the video and audio streams. Typically, a locking feature locks files or data-pages that are being analyzed and/or edited. However, the locking feature can lock a portion of a video stream or a portion of an audio stream. In one example, the locking feature locks a portion of the video stream (e.g., a set of video frames) and a portion of the audio stream (e.g., a set of audio packets). In general, the video stream includes a plurality of video frames spread out over a timeline 308, which is also referred to herein as video data. In one example, the video data can include information within one or more frames that are provided at 24, 30 or 60 fps within a video stream. The audio stream includes a plurality of audio packets spread out over a timeline 308, which is also referred to herein as audio data. Each video frame and each audio packet includes an embedded timestamp, and, in some cases, additional metadata (e.g., source information data).

In some embodiments, when the locking feature is deployed an indication that a common portion of the video data or the audio data is being analyzed or edited by a user is presented, via a user interface, to one or more of the users. The presentation can include delivering a warning notification or similar message to the display of the user that was trying to edit the common portion of the video data or the audio data and/or to the display of all of the other users that are currently editing other portions of the video data or the audio data. In one example, the warning notification can include a notification that a certain parameter or value cannot be adjusted and/or will not be entered due to another user, due to their relative priority or a time related reason (e.g., first to start edits), has priority to make the alterations to the video data or the audio data. The presentation can also or alternatively include altering a graphical representation of a portion of the collaborative editing region 375, such as a portion of an action bar, within the user display 300. The alteration of the graphical representation can include changing the color of a region within the collaborative editing region 375, such as a region of an action bar, adding additional lines or characters to a region within the collaborative editing region 375 or altering text associated with a region of the collaborative editing region 375.

By precluding the plurality of users 104 from simultaneously altering the same video/audio stream, the locking feature can prevent a tug-of-war between multiple users attempting to edit the same portion of a video. Although the locking feature locks a portion of the video stream, the locking feature does not preclude the plurality of users from editing a different portion of the video stream simultaneously. For example, a first user 104A may edit a portion of a video stream or audio stream at the 00:02 timestamp, and a second user 104B may edit a portion of a video stream or audio stream at 01:10 simultaneously without issue. Once a user 104A-104C is finished editing the selected portion of the video or audio stream, the locking feature is released and the frames or packets of the video and audio streams are able to be edited by a different user.

In some embodiments, the locking feature may further include a "queuing" feature. Based on a defined "editing priority" hierarchy and defined user attributes, user relationships and/or status of various users, the queuing feature is used to assign a user priority relative to the other users attempting to access a video and/or audio stream. In some embodiments, a user designated as a "host" will have the ability to access each video and/or audio stream regardless of the lock feature. The host user can in some cases be the originator of the collaboration session. Users designated as "guests," or lower priority users, in some embodiments, are not able to avoid the locking feature and will be prevented, by the locking feature, from accessing a locked portion of the video and/or audio stream. If a host attempts to edit the same portion of the video or audio stream that a guest is currently analyzing and/or editing, the host, having a higher priority than the guest, will be given priority. In this circumstance, the guest user is temporarily locked out of the same portion of the video and/or audio stream that the host is now analyzing and/or editing by the locking feature until the host has stopped analyzing and/or editing that portion of the video and/or audio stream. The locking feature is also beneficial for previewing the audio/video stream, and is further discussed in relation to FIGS. 3A-3D below. The queuing feature further includes a queuing hierarchy, which is based on a priority assigned to each guest user by the host user. The queuing hierarchy comprises a range of priorities which include a highest priority and a lowest priority. A user designated as the lowest priority will be locked out by every other user. A user designated as the highest priority will lock out the lower priority users. For example, if a second guest user is designated a lower priority than the third guest user, the second guest user will be prevented from simultaneously editing the same portion of audio data or video data as the third guest user. If the third user attempts to alter the same portion of audio data or video data as the second user, the third user will automatically "lock out" the second user, and prevent the second user from continuing to edit the same portion of audio data or video data as the third user.

However, in other configurations, the queuing feature will not include a queuing hierarchy, and instead includes a "first click basis" priority, in which the first user to analyze and/or edit a portion of the audio data or video data will be automatically given the highest priority. Typically, a "first click basis" will allow the first guest user to have the highest priority within a pool of guests, but will not give the guest user a higher priority than a host user, as the host user typically maintains the highest priority to have complete control over all alterations.

Figure 3A:
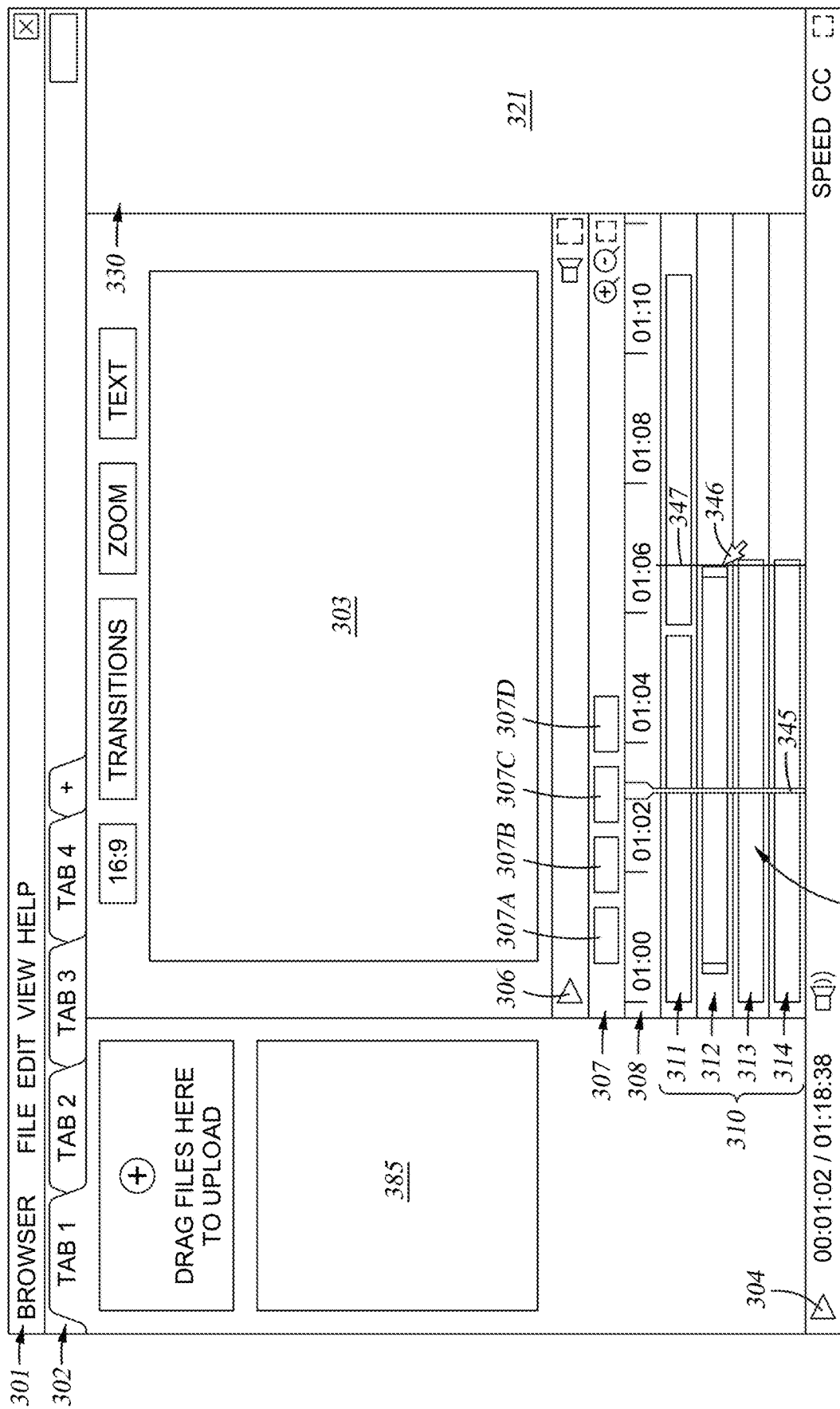
FIGS. 3A-3D are schematic views of a user interface of the web application according to one embodiment.
Figure 3B:
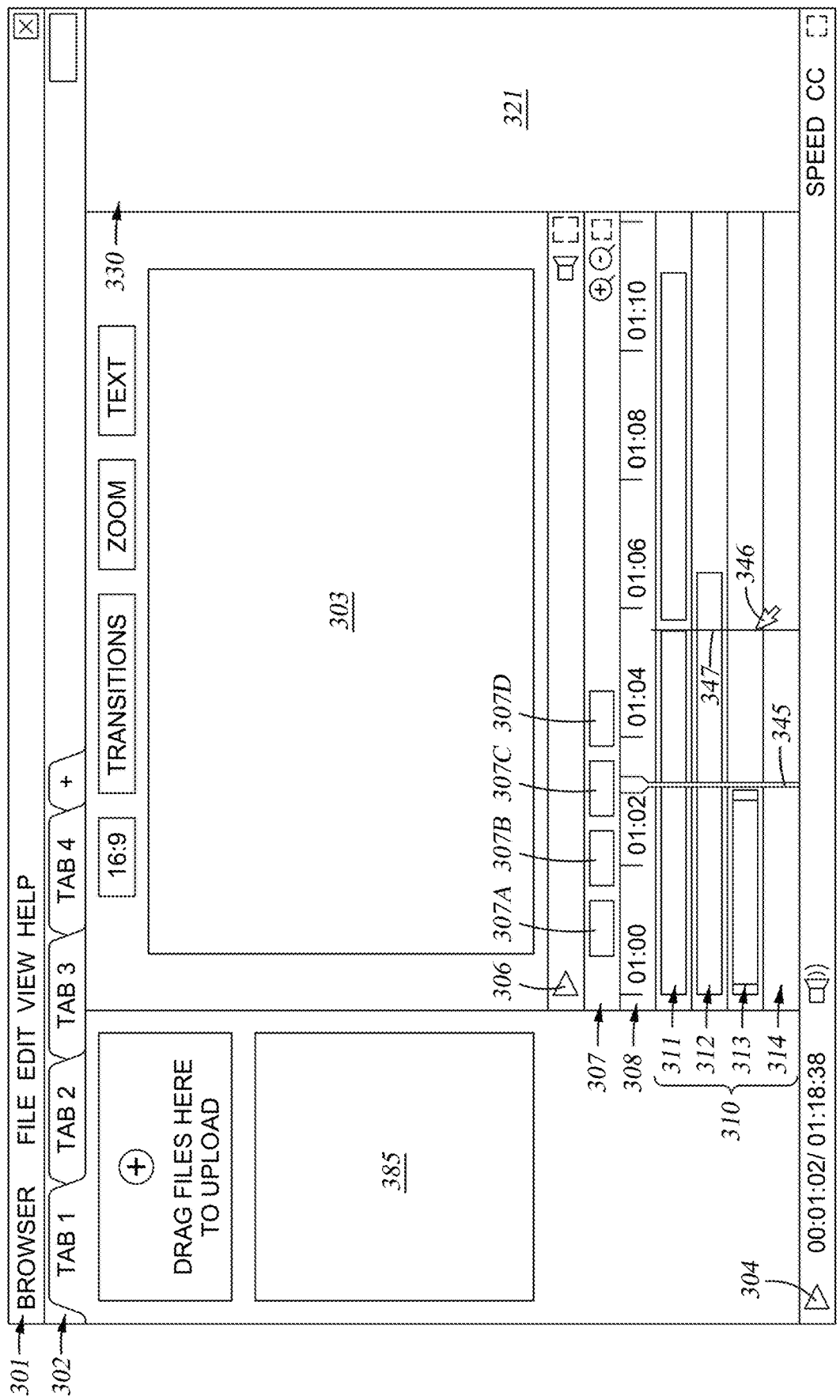
Figure 3C:
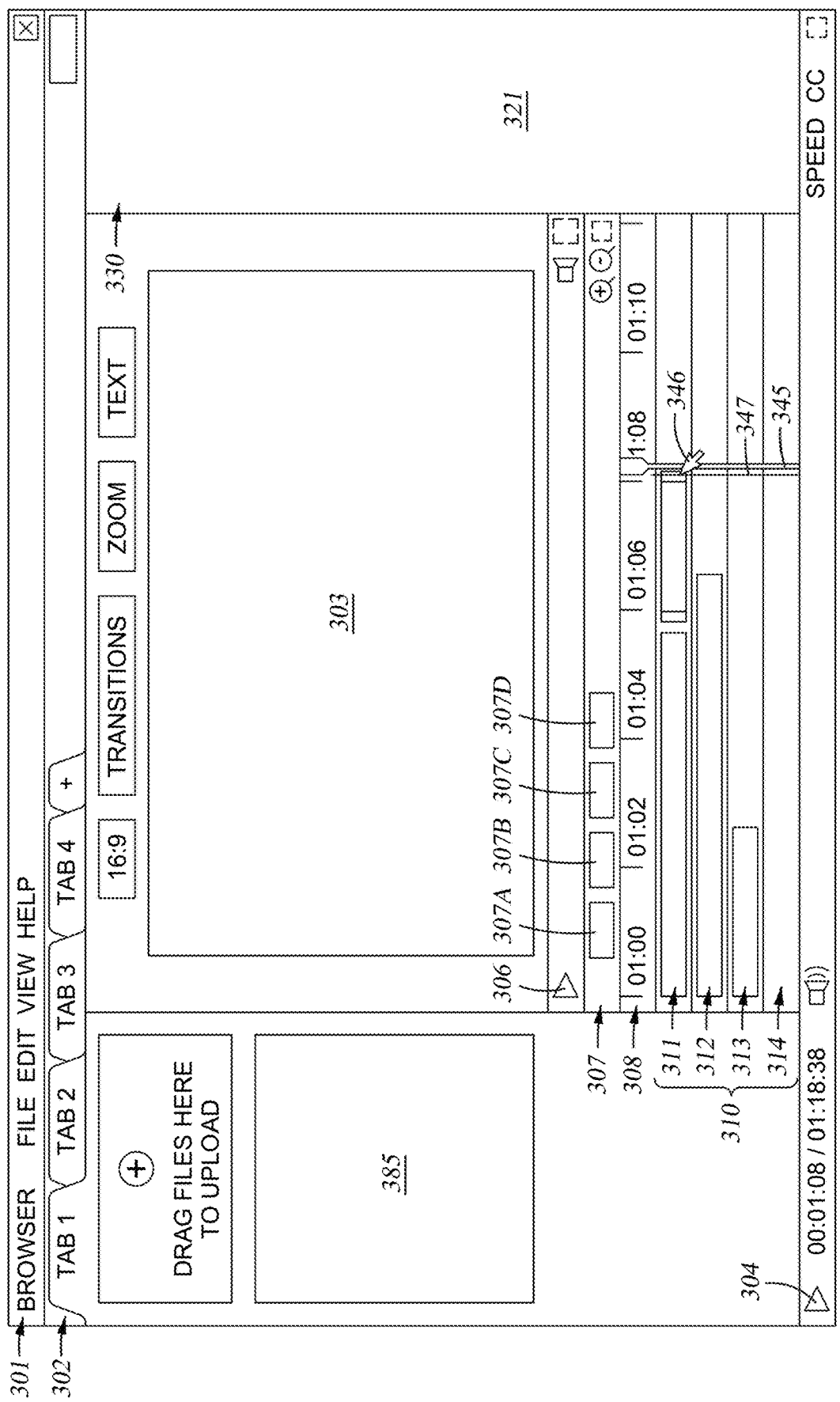
Figure 3D:
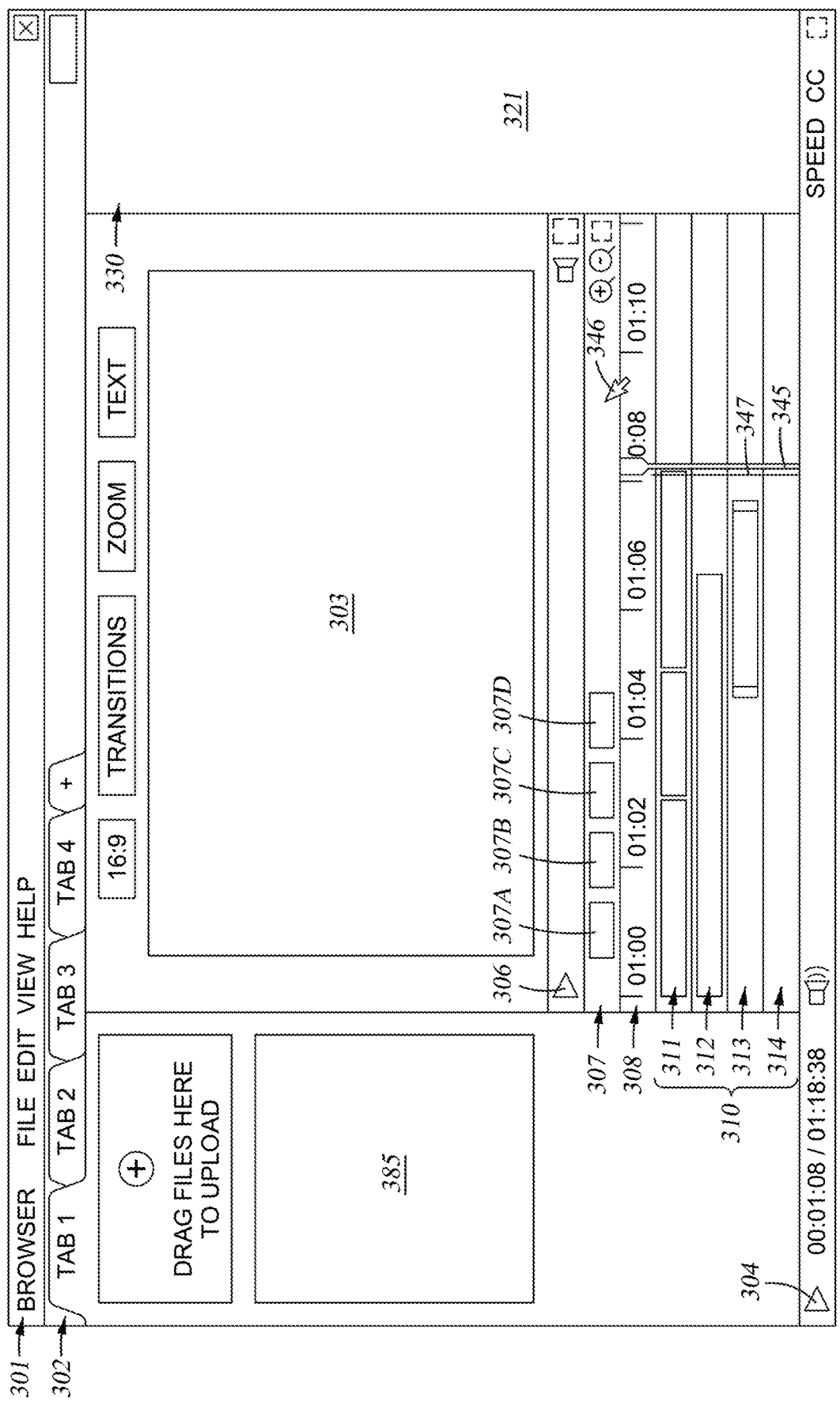

Referring back to FIGS. 3A-3D, a user interface 300A-300C includes a timeline 308 and a plurality of action bars 310, such as two or more action bars 310. Individual action bars 311-314 of the plurality of action bars 310, display video or audio streams along the timeline 308. Typically, the upper action bars display video streams, and lower action bars display audio streams along the timeline 308. For example, the first action bar 311 and the second action bar 312 correspond to video streams spread across timeline 308, and the third action bar 313 and the fourth action bar 314 correspond to audio streams spread across a portion of the timeline 308. The plurality of action bars 310 (e.g., four bars 311, 312, 313 and 314 are depicted in FIG. 3A) can include different action types, such as video stream action bars that are designated for performing video actions (e.g., editing the video data), and audio stream action bars that are designated for performing audio actions (e.g., editing the audio data). In addition to audio and video bars, other action bars may include image elements, transition elements, text overlays, and colored background action bars.

The plurality of action bars 310 form a collaborative editing region 375 where a plurality of users 104A-104C can simultaneously edit portions of video data and audio data by creating a plurality of alteration parameters to adjust video data and/or audio data. For example, a first user 104A interacts with video data of the video stream at the first action bar 311 at a first time (e.g., time stamp 00:01), while a second user 104B simultaneously interacts with the video data of the video stream at the first action bar 311 at a second time (e.g., time stamp 01:16) along timeline 308. As seen in FIGS. 3A-3D, each action bar is positioned to form an action bar stack. As the video is played, a time bar 345 passes through the stack of action bars. The time bar 345 is associated with each user's user interface, and denotes the position in time of the video streams and/or audio stream which they are viewing.

The user interface 300 further includes an undo process as discussed below in relation to FIGS. 3A-3D. As previously mentioned, the undo feature allows a user to undo alterations by reverting the video data of the video stream or audio data of the audio stream to a previous state. The multiuser collaborative video editing system 100 is able to do so by storing uncompressed alteration data in the alteration parameter database 501 on the application server 110. By storing data within the alteration parameter database 501 found on the application server 110, the system is able to re-call previous alterations to the video and/or audio stream, before the audio data and video data within the one or more edited streams are used to form a new edited media file after the alteration parameter database 501 has been finalized. In some cases, the process will include encoding by the process server 112 the one or more edited streams into a media file format after the alteration parameter database 501 has been finalized.

As seen in FIGS. 3A-3D, when a user is actively editing an audio or video stream in the collaborative editing region 375, that user's cursor 346 is visible to other users as a bookmark bar 347. The location of the bookmark bar 347 that other users see on their audio or video streams on their respective user interfaces is directly correlated to the current location of the user's cursor 346 on the audio or video stream on the users interface. For example, if a first user 104A is altering a portion of a video stream in the first action bar 311, the second user 104B and third user 104C will see a bookmark bar 347 associated with the first user displayed on their first action bar 311 of their respective user interfaces. In one example, a video action bar and an audio action bar disposed within the collaboration editing region 375 of the web application is configured to, due to an interaction of a first user with a portion of the video action bar, allow the first user to view different portions of the video data within the video stream, and/or, due to an interaction of the first user or a second user with a portion of the audio action bar, allow the first or the second user to separately sample different portions of the audio data within the audio stream.

The user interface 300 further includes a plurality of tabs 302, a tool bar 301, and a history window 385. The tool bar 301 contains various drop down menu options, such as file, edit, view and help. The user interface 300 also includes an editing tool bar 307 which includes a plurality of editing tools 307A-307D (typically identified by a character or symbol) for editing the plurality of video and audio streams. These editing tools 307A-307D include tools for adding video frames, cropping video frames, trimming video streams, resizing video frames, adding effects to video frames, adding audio streams, muting audio streams, or synchronizing audio streams, and/or other useful audio or video editing functions. The history window 385 displays alteration parameters in a desired order, such as a chronological order, and thus allows a user to track the various alteration parameters associated with each video and audio stream. In some configurations, the alteration parameters can be sorted by specific video stream or audio stream, and thus allow a user to review edits made to a particular video and audio stream. In other configurations, the alteration parameters are sorted by user, and thus allow a user to review edits made by a particular user. In some embodiments, the alteration parameters are displayed with timestamps that are found in the metadata associated with each alteration parameter. In some embodiments, the stored metadata includes comments relating to the edits made by a user. In some configurations, each of the provided comments are also separately timestamped to allow a chronology and history of the editing process to be memorialized. Typically, the comments are stripped from and not incorporated into the metadata that is attached to the finalized edited video stream or audio stream data.

The user interface 300 may further include a preview screen 303 and a chat room 330. The preview screen 303 allows each user of the plurality of users to view the alterations to the video in real time. By storing the user generated alteration parameters at the application server and application server database, the user is able to preview their alterations and/or other users' alterations on the user interface by running commands associated with the user generated alteration parameters on the application server prior to executing the commands on the process server to generate a new media file. The preview feature includes a locking feature that prevents the plurality of users from sharing the same preview screen while simultaneously editing overlapping video or audio stream portions. In some embodiments, when the locking feature is deployed an indication that a common portion of the overlapping video stream portion or audio stream portion is being edited is presented, via the user interface(s), to one or more of the plurality of users. The indication that the common portion of the overlapping video stream portion or audio stream portion is being edited is provided by or can be generated by a command generated from the web application. When a user previews a video on their user interface 300, the status of that video is displayed on the status feature 304. The status feature 304 can include play, stop, pause, and rewind. Each status feature is correlated to the status of the video on each user's interface. The user interface 300 also includes a play button 306. Although not shown, the user interface 300 additionally includes a pause button, stop button, rewind button, forward button, fast forward button and fast rewind button. These additional buttons are sequentially positioned adjacent to the play button. The chat room 330 includes a chat box 321. The chat box 321 is an additional collaborative region of the user interface 300 that allows users 104 to submit their own text or graphical content and view the text or graphical content submitted by other users 104. A typical chat box 321 displays user names, and often includes a controller to invite other users 104 to join the session. In one embodiment, the chat room 330 may also include a video chat 322. The video chat 322 may include a live video feed collected from a video device, or a video stream from a third party platform. In some configurations it may be desirable to include a security feature, to allow the host to encrypt communications during the session, or to set a password.

Figure 4:
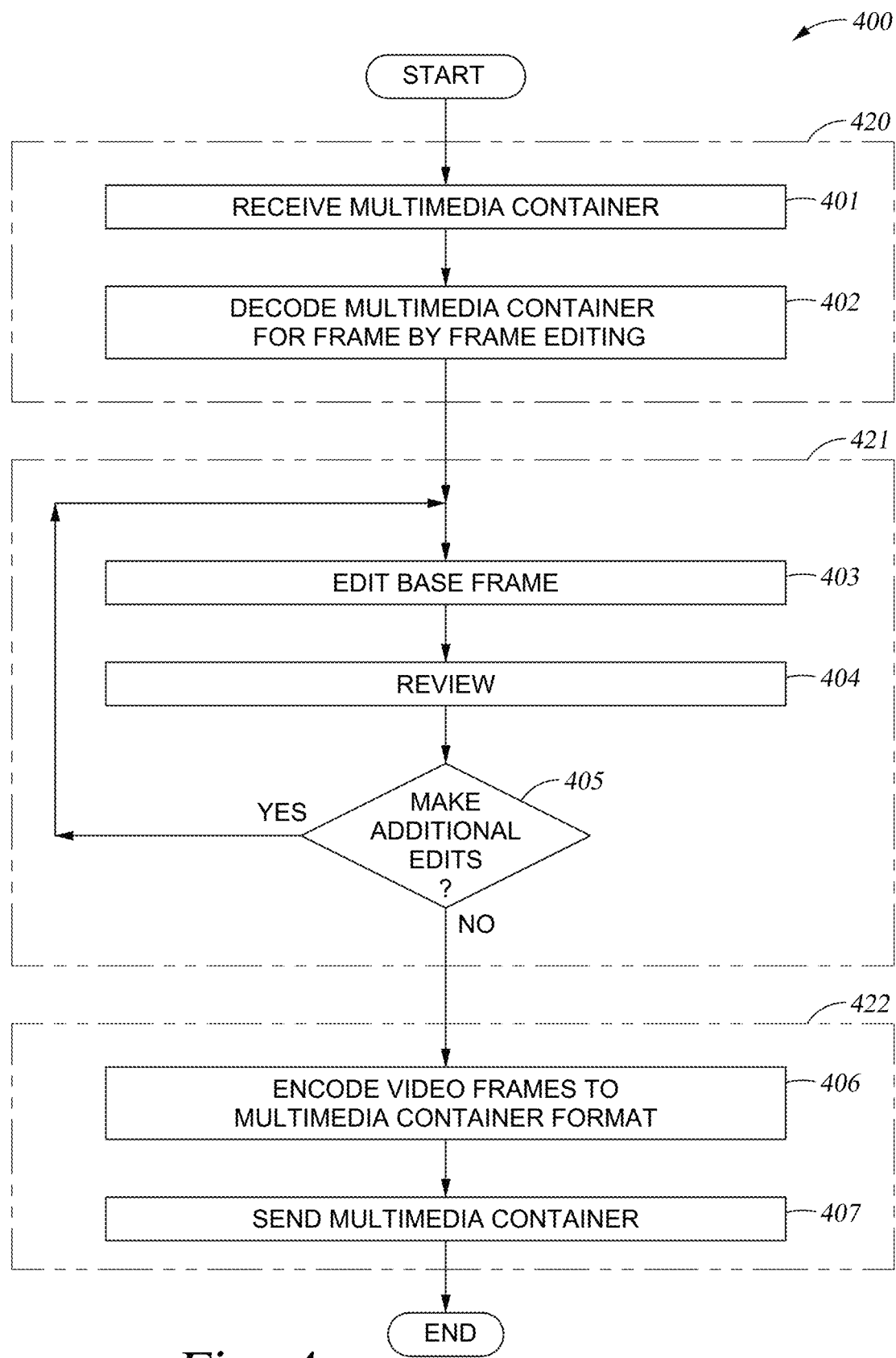
FIG. 4 is a method of using the multi-user collaborative video editing system according to one embodiment.

FIG. 4 is a diagram illustrating a method 400 of using the multi-user collaborative video editing system 100. Generally, a media file is imported to the cloud based servers, and the video stream and audio streams are decoded to uncompressed video frames and audio packets. The video data of the video streams, and the audio data of the audio streams are edited using the web application 105. The edits are then previewed on the web application 105. If the edits are satisfactory, then the alteration parameters (e.g., parameters 511, 512 and 513) are executed by the process server 112 to create a new media file that is different from the media file that was originally imported. Thus, by use of the techniques described herein, users can collaboratively edit a media file in a collaborative environment on the web application 105.

At activity 401, the method 400 includes receiving a media file from a source (e.g., a third party streaming platform, or third party user device) at one of the cloud based servers. Most media files are stored in a container format. Although cloud based server can send or receive various container formats, a typical container format is MPEG-4 Part 14 (mp4). However, other container formats such as MOV, WMV, FLV, AVI, WebM, or MKV formats may be used so long as they allow for audio/video streaming over the internet. The container also includes metadata associated with the video streams and audio streams. The media file can be received by either the application server 110 or the process server 112.

At activity 402, the method 400 optionally includes decoding the video streams and audio streams at one of the cloud based servers. Before editing the video streams and audio streams, the video streams and audio streams must be decoded to a suitable editing format. Here, the video streams and audio streams are decoded to uncompressed video data (i.e., frames) and uncompressed audio data (i.e., audio packets) that are suitable for audio/video editing. In one configuration, video streams and audio streams from the media file are decoded at process server 112.

At activity 403, the method 400 includes altering video data of a video stream or audio data of an audio stream. The video data and the audio data is edited by the user 104A-104C using the web application 105. These alterations can include adding video frames, cropping video frames, trimming video streams, resizing video frames, adding effects to video frames, adding audio streams, muting audio streams, or synchronizing audio streams etc. When a user 104A-104C interacts with a video or audio stream in the user interface 300 of the web application 105, the user 104A-104C generates data by sending and receiving information (alterations) to and from the application server 110. As discussed above and in more detail further below, the information (alterations) that is sent to application server 110 is used to generate alteration parameters (e.g., alteration parameters 511 and 512) that are saved in the alteration parameter database 501. In some embodiments, the alterations made to the video data within a video stream or audio data within an audio stream, besides altering the video content and/or audio content, can also include altering a specific data parameter associated with the video data and/or the audio data. In one example, a data parameter of the video data that can be altered includes, but is not limited to, white balance, brightness, contrast, depth of field, anti-aliasing (AA) or other useful video quality related adjustment. In one example, a specific data parameter of the audio data that can also be altered can include, but is not limited to, equalizer settings, loudness, volume, or other useful audio quality related adjustment. In configurations where multiple users are altering various portions of video and audio streams simultaneously, the information generated by each user's edits is individually stored as the alteration parameters in the alteration parameter database 501 at the application server 110 and database 120A. In some embodiments, the performance of method 400 can include a sequence where activity 403 is simultaneously performed by two or more of the users 104A-104C over a period of time, which can cause the generated alteration parameters, such as alteration parameters 511-513 shown in FIG. 5, to be interleaved in time.

When a user desires to make an alteration to a video or audio stream, the user's data is temporarily stored at the application server 110 and the application database 120A as alteration parameters. While the user's parameters are temporarily stored at the application server 110 and database 120A, the user is able to view their alterations in the video preview of their user interface 300. In some cases, comments regarding the edits can be provided in the metadata associated with the alteration parameters and timestamped for use by one or more users that are collaborating on the editing of the video and audio streams.

As similarly described above, in cases where the locking feature is deployed during activity 403, an indication that a common portion of the overlapping video stream portion or audio stream portion is being edited is presented, via the user interface(s), to one or more of the plurality of users. Also, comments provided in the metadata can include information relating to the deployment of the locking feature, such as a list of the affected users and/or a chronological list of the created alteration parameters relating to the particular portion of the video or audio streams.

At activity 404, the method 400 includes reviewing the alterations by previewing the video stream and/or audio streams on the web application 105. As previously mentioned, the web application 105 is hosted on the application server 110.

At activity 405, the method 400 includes optionally making additional alterations if the previewed alterations are unsatisfactory to the user. Additional alterations can include undoing previous alterations to revert the video stream and/or audio stream to a previous state. As previously mentioned, the data associated with each user's alterations is temporarily stored in the alteration parameter database 501 at the application server 110 and the application server database 120A. By re-accessing this data, the user is able to sort, undo previous parameters, and revert the audio and/or video stream to its previous state by removing parameters that would be executed at the process server 112. Once the user 104 indicates that they are satisfied with the video and audio streams, as often referred to herein as being "finalized," the data associated with the user's alterations is sent to and received by the process server 112.

At activity 406, the method 400 includes executing the alteration parameters to create a new media file at the process server 112. In some embodiments of activity 406, and in cases where activities 402-405 are performed, the activity 406 includes encoding the video streams and the audio streams at the process server 112. In this case, the audio streams and the video streams are encoded from uncompressed streams to a media file suitable for storing video and audio data (e.g., mp4). Encoding the audio streams and video streams includes storing metadata associated with the video stream and audio stream in the container.

During activity 407, the method 400 includes sending the new media file to a user device 103 or a third party. The third party can include a third party streaming platform or third party streaming device.

FIG. 5 is an example of an alteration parameter database 501 that includes a plurality of alteration parameters 511, 512 and 513 that are generated by one or more users that are simultaneously and/or separately collaboratively altering a media file, according to one embodiment. The plurality of user generated alteration parameters are generated by one or more user inputs provided to their respective web browsers 102 running on their user device 103, and are received at the application server 110 via one or more threads. The alteration parameters are previewed on the user interface of the web application 105. After the alteration parameter database 501 has been finalized, the alteration parameters are then executed by software running on the process server 112 to create a new media file at the process server 112. As seen in FIG. 5, a first user 104A and a second user 104B, both simultaneously create a plurality of alteration parameters to be executed at the process server 112 to generate a new media file. As previously mentioned, these commands can be run on the application server 110 and thus previewed by the users, such as users 104A and 104B, without requiring the creation of a new file at the application server 110 or process server 112.

In some embodiments, each alteration parameter that is generated by a user based on a desired editing action (e.g., such as keystrokes or mouse clicks) performed at an instant in time, include metadata 521 and editing data 522. The metadata found in each alteration parameter, such as alteration parameter 511 generated by a first user at time $T_1$ and alteration parameters 512 generated by a second user at time $T_2$, and alteration parameters 513 generated by the first user at time $T_N$, will include information relating to the editing action itself and not the actual edits that are to be made to the video or audio data. In some embodiments, the metadata 521 includes information such as time information (e.g., a time stamp, date information, duration of editing process performed by the user), user information (e.g., user's identification, user's editing priority information, user comments, etc.) and data type information, which includes an identification of video or audio data that is being edited. In some embodiments, the metadata will include information relating to each user's "editing priority," which includes a set hierarchy regarding a user's ability to edit or not edit the media file, what type of data the user is allowed to edit, the ability of one user to override the edits made by one or more other users, and other information that is able to define who has the final say in the editing process and break any undesirable deadlocks during the editing process.

The editing data 522 within each alteration parameter will include one or more commands that specify the edits that are to be made to the audio data or video data based on the inputs received from the user. The editing data 522 will include one or more commands that when run by the software running in the application server 110 will allow a user to preview the one or more alteration parameters found within the alteration parameter database 501 at the time the preview is requested by the user, and allow an edited version of the media file to be generated after the alteration parameter database 501 has been finalized and executed by the process server 112 during activities 406 of method 400.

As seen further in FIG. 5, a first user and a second user generate alteration parameters 511, 512 and 513, respectively, which pertain to different portions of the video and audio streams. In a typical user environment, these alteration parameters would be generated simultaneously, and could be previewed in real time using the preview screen 303 on the web application 105. For clarity of discussion, as illustrated in FIG. 5, the alteration parameter database 501 includes a first alteration parameter 511, a second alteration parameter 512 that is generated after the first alteration parameter, and a third alteration parameter 513 that is generated after the second alteration parameter 512. Moreover, as illustrated in FIG. 5, a plurality of alteration parameters may be generated between the time that the second alteration parameter 512 is generated and the third alteration parameter 513 is generated.

Figure 6:
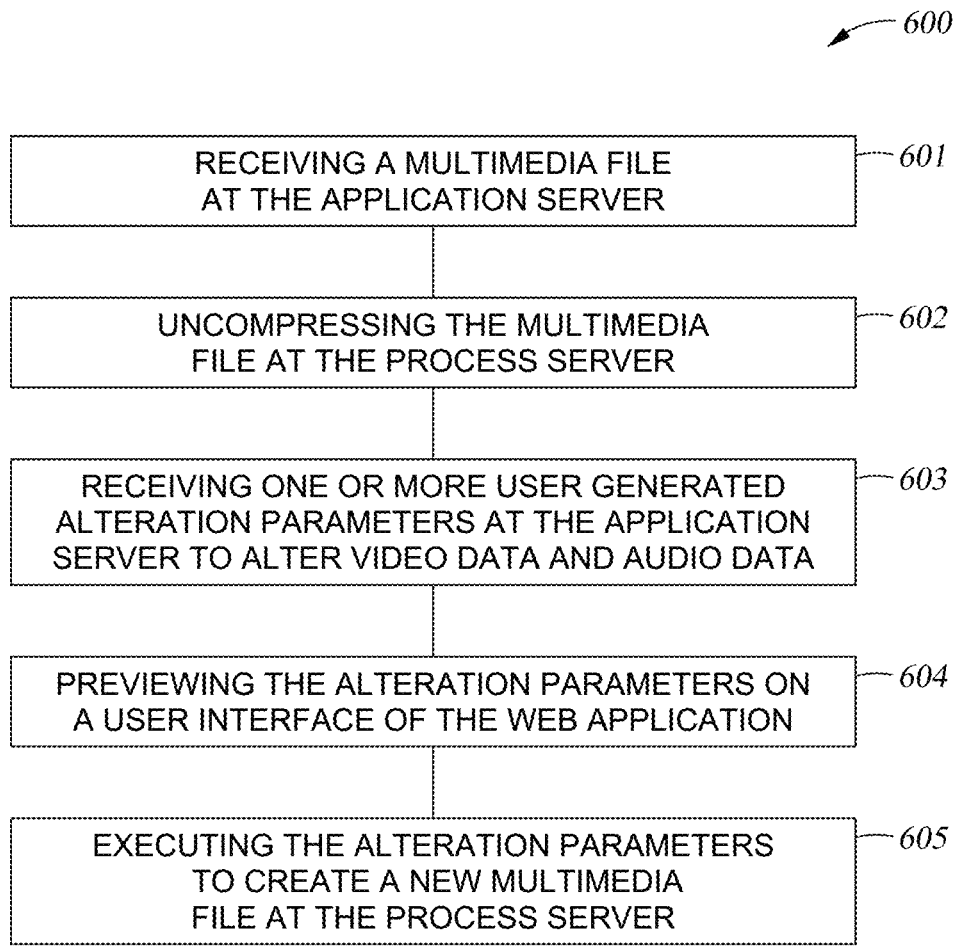
FIG. 6 is a method of using the multi-user collaborative video editing system according to one embodiment.

FIG. 6 is a diagram illustrating a method 600 of using the multi-user collaborative video editing system. At activity 601, the method includes receiving a media file at the application server 110. At activity 602, the method includes uncompressing the media file at the process server 112 to access video data of the video stream and audio data of the audio stream in the media file. At activity 603, the method includes receiving one or more user generated alteration parameters to alter the video data of the video stream and audio data of the audio stream at the application server 110, wherein the user alteration parameters are generated on a web application 105 hosted on an application server 110. Typically, the alteration parameters are generated by a plurality of users 104 and received at the application server 110 at the same or at different times. However, in some embodiments, the alteration parameters may be generated by the users 104 at the same time, and subsequently received by the application server 110 at the approximately the same time. Approximately the same time can include a delay of 1 second or more, and can be based on delay in the user's network connectivity. Once the alteration parameters are received by the application server 110, the alteration parameters are applied to the video data or the audio data to form an altered uncompressed media file.

At activity 604, the method includes previewing the alteration parameters on a user interface 300 of web application 105. Users 104 are able to view their alterations in real time. As previously mentioned, because the alteration parameters are run on the application server 110 without requiring the creation of a new media file, users 104 are able to view their alteration parameters on the preview screen 303 in real time. Real time includes a few seconds after the user creates their alteration parameters.

At activity 605, the method includes executing the alteration parameters to create a new media file at the process server 112. In some embodiments, activity 605 includes applying the alteration parameters to the uncompressed media file, and then encoding from the altered uncompressed media file to create the new media file. The new media file can then be sent to a user device 103 or a third party for use of display.

In some embodiments of the method 600, it may be desirable skip the uncompressing the media file process found in activity 602 and the process of applying the alteration parameters to the uncompressed media file during activity 605, and thus allow the other processes performed in the method 600 to be performed on the received media file. In this case, after the editing process has been performed and the complete list of alteration parameters has been created and saved the method will include applying the complete list of alteration parameters to the multimedia container received during activity 601 to form the new edited multimedia container. Similarly, in some embodiments of the method 400, it may be desirable skip the decoding activity 402 and encoding activity 406 and thus allow the processes performed during the activities 421 to be performed on the received media file, and then after the editing process has been performed and the complete list of alteration parameters has been created and saved the process will include applying the complete list of alteration parameters to the multimedia container received during activity 401 to the new edited multimedia container.

While the foregoing is directed to embodiments of the present disclosure, other and future embodiments of the disclosure may be devised without departing from the basic scope thereof, and the scope thereof is determined by the claims that follow.

What is claimed is:

1. A method for simultaneously editing a video by a plurality of users comprising:
receiving, by an application server, a media file that comprises video data and audio data;
analyzing, on a first instance of a web application hosted on the application server, a portion of the video data or the audio data, wherein analyzing the portion of the video data or the audio data is performed by a first user of the plurality of users for a first period of time;
preventing a second user of the plurality of users from altering the portion of the video data or the audio data during the first period of time, wherein the second user is given a queuing hierarchy priority to edit the portion of the video data or the audio data that is less than a queuing hierarchy priority given to the first user,
the queuing hierarchy priority of the second user to edit the portion of the video data or the audio data is greater than the queuing hierarchy priority of any other user of the plurality of users attempting to edit the portion of the video data or audio data during the first period of time, and
the second user is able to alter the portion of the video data or the audio data after the first period of time has lapsed and before any of the other users of the plurality of users; and
generating an indication that the portion of the video data or the audio data is being analyzed by the first user, wherein the generated indication is received on a second instance of the web application by the second user during the first period of time.

2. The method of claim 1, further comprises:
generating, by the first user, a first alteration parameter that includes information relating to a first alteration made to the portion of the video data or the audio data during the first period of time; and
storing the first alteration parameter within an alteration parameter database.

3. The method of claim 2, further comprises:
generating, by the second user, a second alteration parameter that includes information relating to a second alteration made to the portion of the video data or the audio data after the first period of time has elapsed; and
storing the second alteration parameter within the alteration parameter database.

4. The method of claim 3, wherein the first and the second alteration parameters are configured to alter a specific data parameter of the portion of the video data or audio data.

5. The method of claim 4, wherein generating the indication that the portion of the video data or the audio data is being analyzed by the first user comprises indicating that a specific data parameter of the portion of the video data or audio data is being analyzed.

6. The method of claim 2, further comprising:
previewing, by the second user on the second instance of the web application, the video data and audio data that is altered based on information contained within the generated first alteration parameter;
generating, by the second user, a second alteration parameter that includes information relating to a second alteration made to the portion of the video data or the audio data after the first period of time has elapsed; and
storing the second alteration parameter within the alteration parameter database.

7. The method of claim 1, wherein at the end of the first period of time terminating the prevention of the second user from causing an alteration parameter to be generated by the second user through the second instance of the web application.

8. The method of claim 1, wherein the generated indication is received on the second instance of the web application by the second user after the second user has attempted to at least analyze the portion of the video data or the audio data during the first period of time.

9. A system for simultaneously editing a video by a plurality of users comprising a web application hosted on an application server comprising a collaboration region and a preview screen, wherein the web application is configured to allow a user to:
  receive, by an application server, a media file that comprises video data and audio data;
  analyze, on a first instance of a web application hosted on the application server, a portion of the video data or the audio data, wherein the analyzing the portion of the video data or the audio data is performed by a first user of a plurality of users for a first period of time;
  prevent a second user of the plurality of users from altering the portion of the video data or the audio data during the first period of time, wherein
    the second user is given a queuing hierarchy priority to edit the portion of the video data or the audio data that is less than a queuing hierarchy priority given to the first user,
    the queuing hierarchy priority of the second user to edit the portion of the video data or the audio data is greater than the queuing hierarchy priority of any other user of the plurality of users attempting to edit the portion of the video data or audio data during the first period of time, and
    the second user is able to alter the portion of the video data or the audio data after the first period of time has lapsed and before any of the other users of the plurality of users; and
  generate an indication that the portion of the video data or the audio data is being analyzed by the first user, wherein the generated indication is received on a second instance of the web application by the second user during the first period of time.

10. The system of claim 9, wherein the collaboration region of the web application comprises a video action bar and an audio action bar, wherein
  due to an interaction of a user with the video action bar the web application is configured to allow a user to view different portions of the video data, and
  due to an interaction of a user with the audio action bar the web application is configured to allow the user to view different portions of the audio data.

11. The system of claim 10, wherein the generation of the indication that the portion of the video data or the audio data is being analyzed by the first user comprises altering a graphical representation of a portion of the video action bar.

\* \* \* \* \*